United States Patent
Locker et al.

(10) Patent No.: US 10,387,721 B2
(45) Date of Patent: Aug. 20, 2019

(54) INFORMATION HANDLING DEVICE HANDWRITING CLEAN-UP

(71) Applicant: Lenovo (Singapore) Pte. Ltd., Singapore (SG)

(72) Inventors: Howard Locker, Cary, NC (US); Daryl Cromer, Cary, NC (US); Aaron Michael Stewart, Raleigh, NC (US); Karen Ruth Kluttz, Raleigh, NC (US); Michaela Rose Case, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 244 days.

(21) Appl. No.: 13/944,377

(22) Filed: Jul. 17, 2013

(65) Prior Publication Data

US 2015/0022462 A1 Jan. 22, 2015

(51) Int. Cl.
*G06K 9/00* (2006.01)
*G06F 3/0488* (2013.01)

(52) U.S. Cl.
CPC ..... *G06K 9/00402* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 2004/0085301 A1* | 5/2004 | Furukawa | ........... | G06F 3/04883 345/179 |
| 2007/0025618 A1* | 2/2007 | Lin | ..................... | G06K 9/00416 382/186 |
| 2010/0238195 A1* | 9/2010 | McGee | ............... | G06F 3/04883 345/634 |
| 2013/0106865 A1* | 5/2013 | Eibye | ................. | G06K 9/00416 345/467 |
| 2013/0343639 A1* | 12/2013 | Benko | ..................... | G06T 11/60 382/155 |
| 2014/0164974 A1* | 6/2014 | Kim | ..................... | G06F 3/04883 715/773 |

* cited by examiner

*Primary Examiner* — Fred H Hu
(74) *Attorney, Agent, or Firm* — Ference & Associates LLC

(57) ABSTRACT

An embodiment provides a method, including: accepting, at an input surface, handwriting input; identifying, using one or more processors, one or more characters included in the handwriting input; modifying one or more of the one or more characters included in the handwriting input to match penmanship; and rendering, on a display device, the handwriting input including one or more modified characters. Other aspects are described and claimed.

19 Claims, 4 Drawing Sheets

INFORMATION HANDLING DEVICE HANDWRITING CLEAN-UP

BACKGROUND

Information handling devices ("devices"), for example cell phones, smart phones, tablet devices, laptop and desktop computers, televisions, navigation systems, e-readers, etc., employ one or more input devices. Among these input devices are input surfaces such as a touch sensitive input surface, for example touch screens and digitizers.

Input surfaces are commonly employed as sub-systems with integrated logic and memory. Examples include digitizers and touch screens that continually record the location of a stylus pointer or finger (relative to the input surface). This location information may be reported to the system, e.g., typically the operating system (OS) uses this location information to render some visual effect based on the location information. Handwriting is an increasingly common form of input to such input surfaces. Users often provide handwriting input with the assistance of a pen or stylus, although this is not required and a user may in fact provide handwriting input simply using his or her finger. Although handwriting is a natural mode of input that many users enjoy, using current devices there are certain drawbacks to the use of handwriting input.

BRIEF SUMMARY

In summary, one aspect provides a method, comprising: accepting, at an input surface, handwriting input; identifying, using one or more processors, one or more characters included in the handwriting input; modifying one or more of the one or more characters included in the handwriting input to match penmanship; and rendering, on a display device, the handwriting input including one or more modified characters.

Another aspect provides an information handling device, comprising: an input surface; a display device; one or more processors; a memory device storing instructions accessible to the one or more processors, the instructions being executable by the one or more processors to: accept, at the input surface, handwriting input; identify, using the one or more processors, one or more characters included in the handwriting input; modify one or more of the one or more characters included in the handwriting input to match penmanship; and render, on the display device, the handwriting input including one or more modified characters.

A further aspect provides a program product, comprising: a storage medium having computer readable program code stored therewith, the computer readable program code comprising: computer readable program code configured to accept, at an input surface, handwriting input; computer readable program code configured to identify, using one or more processors, one or more characters included in the handwriting input; computer readable program code configured to modify one or more of the one or more characters included in the handwriting input to match penmanship; and computer readable program code configured to render, on a display device, the handwriting input including one or more modified characters.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
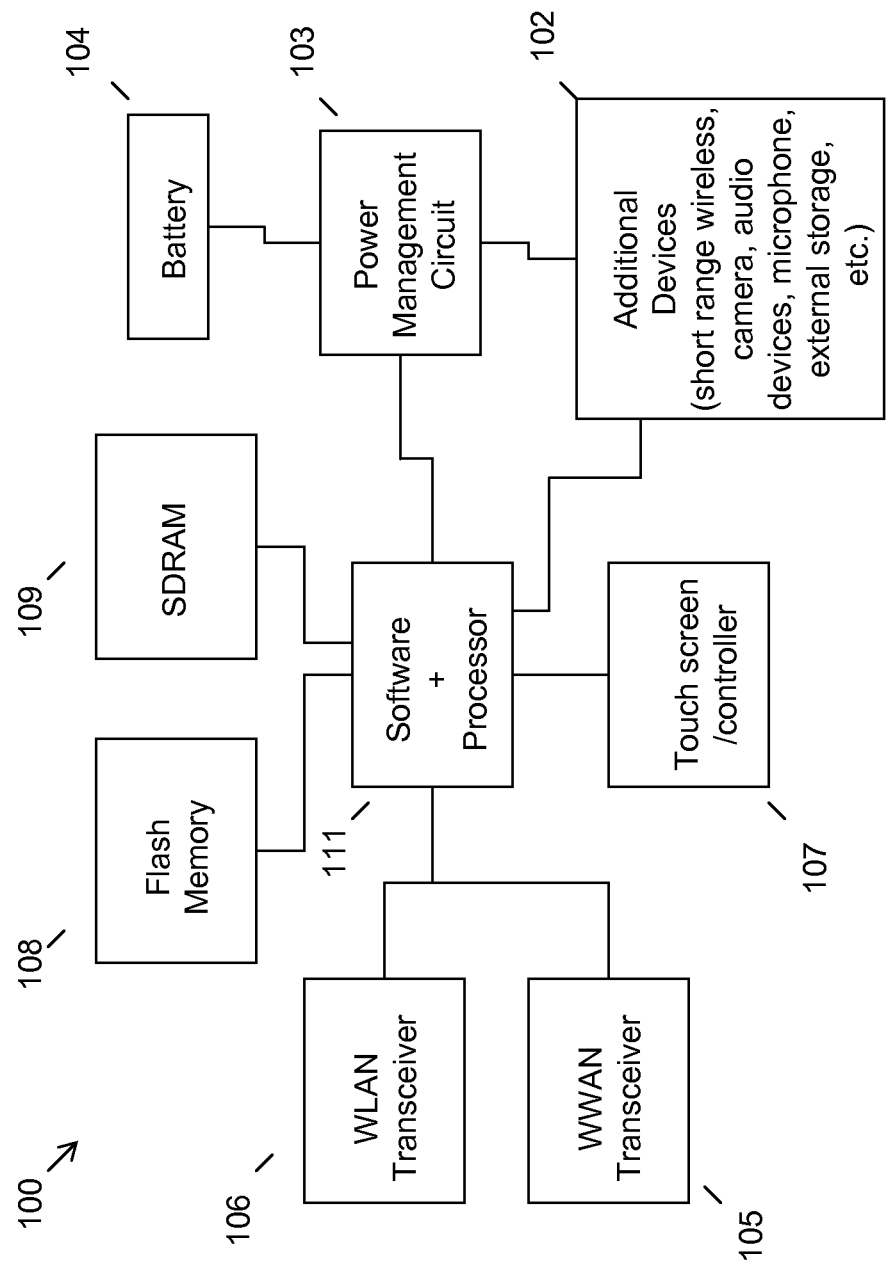
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Among the drawbacks associated with handwriting input is that it is not generally possible to use a stylus for handwriting input and get good quality penmanship, i.e., similar to using a real pen on a piece of paper. There are many reasons for this, e.g., including inaccuracy of the digitizer, difficulty of making sharp turns, smooth circles, etc. with a pen, stylus or even a finger (if used for handwriting input). Most of the attention in conventional devices focuses on improving handwriting recognition for turning handwriting input into text. While this is valuable, it completely misses the need for providing visually appealing handwriting, including handwriting that is rendered as if the user had actually written the input with a traditional writing implement pair (e.g., using a pen and paper).

Accordingly, an embodiment provides for handwriting clean-up. An embodiment implements solutions that take into account the use cases where a user wants the handwriting input to remain as handwriting (i.e., not converted into machine text) and the user wants the handwriting rendered to look like actual handwriting, e.g., the user's own handwriting. In an embodiment, one or more of a variety of techniques are employed to process the raw or initial handwriting input provided by a user into a rendered version of the handwriting (e.g., on a touch screen) that meets the user's desires and expectations with respect to the aesthetic quality of the rendering.

The illustrated example embodiments will be best understood by reference to the figures. The following description is intended only by way of example, and simply illustrates certain example embodiments.

Figure 2:
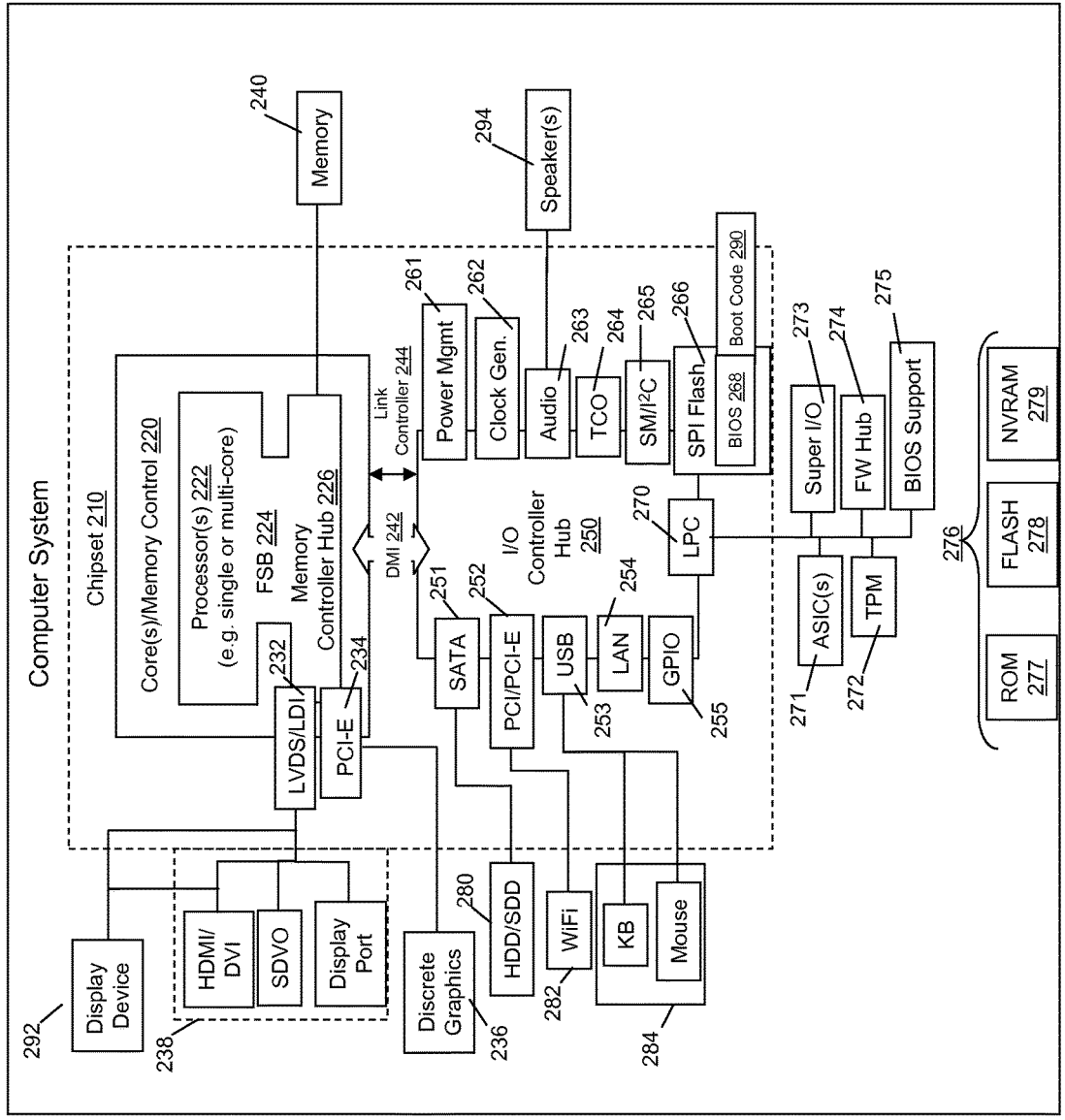
FIG. 2 illustrates another example of information handling device circuitry.

Referring to FIG. 1 and FIG. 2, while various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 111. Internal busses and the like depend on different vendors, but essentially all the peripheral devices (220) may attach to a single chip 111. In contrast to the circuitry illustrated in FIG. 2, the circuitry 100 combines the processor, memory control, and I/O controller hub all into a single chip 111. Also, systems 100 of this type do not typically use SATA or PCI or LPC. Common interfaces for example include SDIO and I2C.

There are power management chip(s) 103, e.g., a battery management unit, BMU, which manage power as supplied for example via a rechargeable battery 104, which may be recharged by a connection to a power source (not shown). In at least one design, a single chip, such as 111, is used to supply BIOS like functionality and DRAM memory.

System 100 typically includes one or more of a WWAN transceiver 105 and a WLAN transceiver 106 for connecting to various networks, such as telecommunications networks and wireless base stations. Commonly, system 100 will include a touch screen 107 for data input and display. System 100 also typically includes various memory devices, for example flash memory 108 and SDRAM 109.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). The architecture of the chipset 210 includes a core and memory control group 220 and an I/O controller hub 250 that exchanges information (for example, data, signals, commands, et cetera) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, et cetera). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280 et cetera), a PCI-E interface 252 (for example, for wireless connections 282), a USB interface 253 (for example, for devices 284 such as a digitizer, keyboard, mice, cameras, phones, microphones, storage, other connected devices, et cetera), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling devices, as for example outlined in FIG. 1 and FIG. 2, may provide input surfaces and subsystems thereof (e.g., digitizer, touch screen or the like) that allow a user to provide handwriting input (e.g., via touch input using a finger tip or stylus, etc.). The handwriting input location is transmitted by the input sub-system and converted, e.g., by an OS and/or graphics sub-system, into renderings on screen. A common example of such input and rendering is providing handwriting input to a touch screen or digitizer with a stylus that is in turn rendered on the display screen as handwritten input.

Figure 3A:
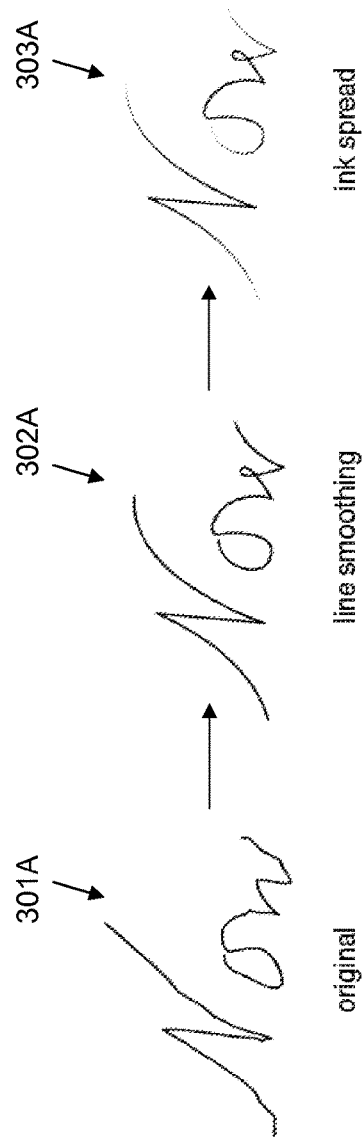
FIG. 3(A-B) illustrates example handwriting input modifications.

Referring to FIG. 3(A-B), an embodiment may employ a two pass approach in which the handwriting input is subjected to initial modifications followed by a second pass of modifications, which may take into account the initial modifications. As an example, an embodiment may first process handwriting input to do line smoothing and/or ink spreading. In the example of FIG. 3A, an embodiment first employs line smoothing as an initial modification and then employs ink spreading as an additional, initial modification. Applying such initial modifications makes the handwritten characters (e.g., letters, symbols, or other handwritten input) more legible and generally look more like actual penmanship.

As can be appreciated from FIG. 3A, such initial modifications attempt to mimic the physical realities of how writing implements work. Thus, line smoothing may be applied (e.g., via digitally adding to, movement of, or taking away of, pixels of handwriting renderings) to make approximations based on known or learned patterns of actual writing implements. In an embodiment, differing amounts or types of line smoothing may be implemented based on the writing implement type to mimic the actual writing implement pair chosen. Thus, a fountain pen/paper writing implement pair may be implemented digitally by using more line smoothing than for a pencil and paper pair. In an embodiment, a user may modify the amount of processing or the type of processing applied to the handwritten input. Thus, a user may make a global determination, e.g., implement line smoothing or modification generally to mimic a pen and paper versus a marker and whiteboard writing implement pair. Additionally or in the alternative, a user may make more refined modification, e.g., only employ line smoothing but not ink spreading. In an embodiment, a user may train the system as to which modification(s) to make, as further described herein.

For its part, ink spreading may be similarly handled as processing for the line smoothing. Again, an embodiment may modify the amount or type of ink spreading dependent upon which writing implement pair is to be matched, user preferences, and the like.

As with other modifications discussed throughout, an embodiment may make modifications at the level of individual character or may take into account surrounding characters. For example, in FIG. 3A, an embodiment may modify the "N" character individually, e.g., as an upper case letter that begins a word, whereas an embodiment may modify the "o" and "w" characters taking into consideration that the user has linked these two characters together to form the end of the word "Now". This may be accomplished in a variety of ways, such as implementing varying degrees of line smoothing or ink spreading (and/or other modification(s)) at different sub-portions of the characters, as illustrated in FIG. 3A. Thus, an embodiment may implement knowledge of the underlying language (e.g., a determination that a character is in a particular place, such as the beginning of a word at the beginning of a sentence) when making modification(s) to the character to mimic the penmanship of a user.

Figure 3B:
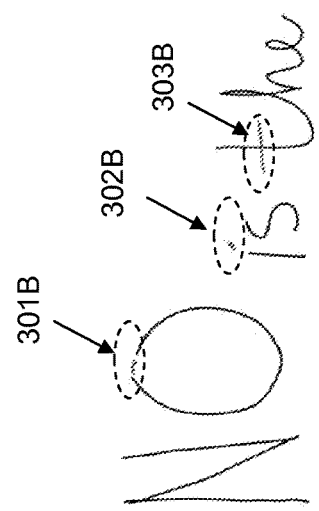

In FIG. 3B it can be appreciated that an embodiment may, following the initial modifications, make additional or a second pass of modifications. In the alternative, the second pass of modifications may be implemented first and/or alone (e.g., responsive to user input indicating a desire not to have initial modifications implemented). For example, an embodiment may complete letters automatically, as indicated in FIG. 3B by closing the loop at the top of the letter "O", by crossing the "t" in the letter "t", and by dotting the "i" in the letter "i". Such second pass modifications may thus recognize what a user inputted and convert the input (or partial input) to a more complete version of handwriting. Again, this may follow the initial modifications.

Figure 4:
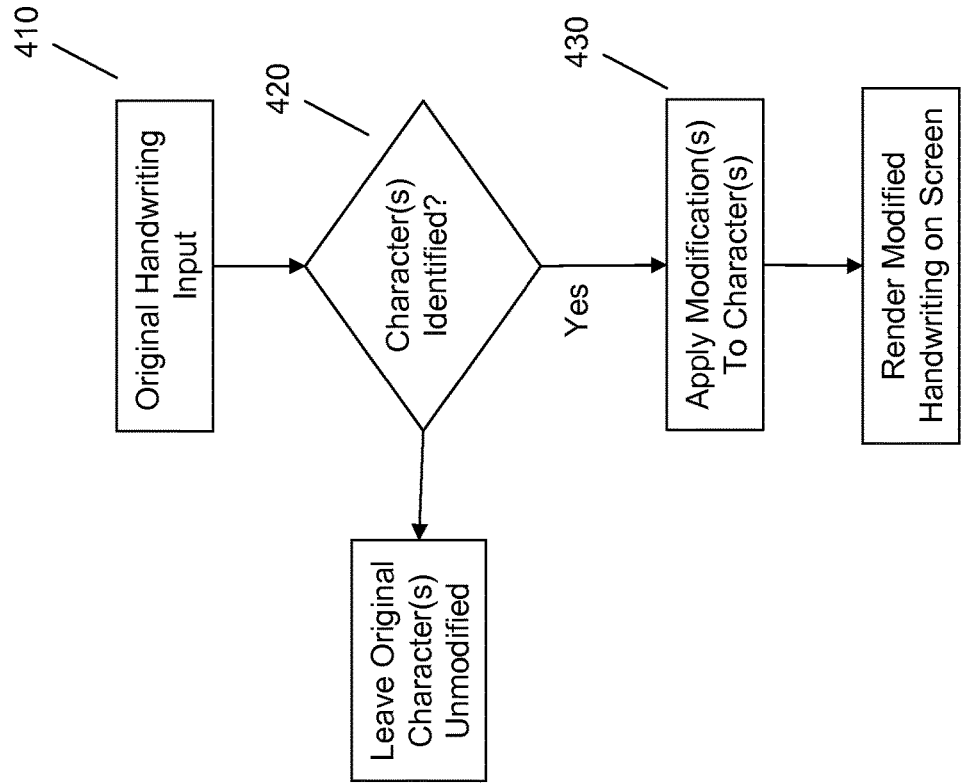
FIG. 4 illustrates an example method for handwriting clean-up.

An embodiment may supplement existing handwriting-to-text algorithms to implement the various modifications, as outlined in FIG. 4. For example, following handwriting input to a device input surface at 410, an embodiment may first employ a handwriting-to-text algorithm to make an initial determination as to which character (letter, symbol, etc.) has been written or partially written at 420. This amounts to taking the user's raw or unprocessed (or minimally processed) handwriting input and ascertaining which characters are present. If such process is unsuccessful, an embodiment may simply render the original character(s).

Once an embodiment has identified which character(s) are present at 420, even partially (e.g., some characters identified, some not), an embodiment may implement modifications such as those outlined herein at 430. Thus, if the letter "O" is recognized, it may be subjected to initial modifications (e.g., line smoothing, ink spreading) and/or additional modifications (e.g., completion of the character if left open, e.g., at the top). Again, the ordering of these modifications may be re-arranged as necessary or desirable to fit a particular type of handwriting input, to fit user preferences, etc.

In terms of converting or modifying the original handwriting input into a "nice" or cleaned-up version that matches actual penmanship (i.e., of a user using a traditional writing implement pair such as pen and paper) at 430, an embodiment may take a variety of approaches. These approaches may include those described heretofore (i.e., initial modifications and additional modifications) as well as other techniques to accomplish the handwriting modification.

As part of learning which modification(s) to make and how to make them (e.g., whether to implement ink spreading for a character, and if so, how much and where), an embodiment may be trained by a user as to which modifications are appropriate to make at 430. This may take the form of having a user carefully (e.g., using a pen and digitizer slowly to accomplish very "neat" handwriting input) trace each character (e.g., letters) that is to be modified. The tracing may be done on the device input surface itself and/or the user may do it with an actual writing implement pair (e.g., a pen and paper) and thereafter scan it into a handwriting application for better penmanship. Such an approach (i.e., scanning, optical character recognition, and capturing of image (i.e., character) attributes such as pixel width, density, etc.) eliminates problems with using a digitizer for training This training information provides an embodiment with guidance as to which types of modifications are appropriate for particular users.

As another example, an embodiment may select a stock handwriting (e.g., a handwriting font available to the device) that is closest to the user's handwriting and use this as a substitute when rendering the handwriting (or particular character(s)) on screen. Thus, an embodiment may be trained (via a variety of mechanisms including careful use of a digitizer or scanning) to simply select an available handwriting font for use in modifying the handwriting inputs rather than making changes to sub-parts of the user's handwriting input.

Accordingly, various embodiments provide techniques to allow the user to more closely match input surface inputs (e.g., using a pen and digitizer) and renderings thereof to actual writing implement visualizations. Such techniques may be implemented either by the digitizer sub-system (e.g., microprocessor thereof) or via inclusion of a system level processing (e.g., of a main device processor), or a suitable combination of both. This permits meeting a user's expectations for handwriting penmanship while using his or her device (e.g., smart phone, tablet, and laptop). A result is higher quality of the handwriting actually rendered on-screen.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   accepting, at an input surface of an information handling device, handwriting input;
   identifying, using one or more processors, one or more characters included in the handwriting input;
   modifying, using one or more handwriting clean-up techniques, one or more of the one or more characters included in the handwriting input to mimic penmanship of a user as if the user is using a predetermined writing implement pair, wherein the predetermined writing implement pair comprises a type of writing implement identified by the user and a type of writing surface identified by the user, wherein the modifying comprises a user trained modification based upon user preferences and previous user handwriting input; and
   rendering, on a display device, the handwriting input including one or more modified characters, wherein the rendered modified characters comprise a profile mimicking the penmanship of the user using the predetermined writing implement pair.

2. The method of claim 1, wherein modifying comprises processing the one or more characters to implement line smoothing at one or more sub-portions of a character.

3. The method of claim 1, wherein modifying comprises processing the one or more characters to implement ink spreading at one or more sub-portions of a character.

4. The method of claim 1, wherein identifying comprises identifying one or more partial characters; and wherein modifying comprises completing the one or more partial characters.

5. The method of claim 1, wherein modifying comprises replacing one or more of the one or more characters with a handwriting font.

6. The method of claim 1, wherein the user trained modification is based upon training input;
   the training input utilized in modifying one or more of the one or more characters included in the handwriting input to match penmanship.

7. The method of claim 6, wherein the training input is provided to the input surface.

8. The method of claim 6, wherein the training input is scanned into a digital format and provided to the information handling device.

9. The method of claim 6, wherein modifying comprises taking into account one or more surrounding characters in selecting a modification to implement for a character.

10. An information handling device, comprising:
    an input surface;
    a display device;
    one or more processors;
    a memory device storing instructions accessible to the one or more processors, the instructions being executable by the one or more processors to:
    accept, at the input surface, handwriting input;
    identify, using the one or more processors, one or more characters included in the handwriting input;
    modify, using one or more handwriting clean-up techniques, one or more of the one or more characters included in the handwriting input to mimic penmanship of a user as if the user is using a predetermined writing implement pair, wherein the predetermined writing implement pair comprises a type of writing implement identified by the user and a type of writing surface identified by the user, wherein the modifying comprises a user trained modification based upon user preferences and previous user handwriting input; and
    render, on the display device, the handwriting input including one or more modified characters, wherein the rendered modified characters comprise a profile mimicking the penmanship of the user using the predetermined writing implement pair.

11. The information handling device of claim 10, wherein to modify comprises processing the one or more characters to implement line smoothing at one or more sub-portions of a character.

12. The information handling device of claim 10, wherein to modify comprises processing the one or more characters to implement ink spreading at one or more sub-portions of a character.

13. The information handling device of claim 10, wherein to identify comprises identifying one or more partial characters; and wherein modifying comprises completing the one or more partial characters.

14. The information handling device of claim 10, wherein to modify comprises replacing one or more of the one or more characters with a handwriting font available to the information handling device.

15. The information handling device of claim 10, wherein the user trained modification is based upon training input;
the training input utilized in modifying one or more of the one or more characters included in the handwriting input to match penmanship.

16. The information handling device of claim 15, wherein the training input is provided to the input surface.

17. The information handling device of claim 15, wherein the training input is scanned into a digital format and provided to the information handling device.

18. The information handling device of claim 15, wherein to modify comprises taking into account one or more surrounding characters in selecting a modification to implement for a character.

19. A program product, comprising:
a storage medium having computer readable program code stored therewith, the computer readable program code comprising:
computer readable program code that accepts, at an input surface, handwriting input;
computer readable program code that identifies, using one or more processors, one or more characters included in the handwriting input;
computer readable program code that modifies, using one or more handwriting clean-up techniques, one or more of the one or more characters included in the handwriting input to mimic penmanship of a user as if the user is using a predetermined writing implement pair, wherein the predetermined writing implement pair comprises a type of writing implement identified by the user and a type of writing surface identified by the user, wherein the modifying comprises a user trained modification based upon user preferences and previous user handwriting input; and
computer readable program code that renders, on a display device, the handwriting input including one or more modified characters, wherein the rendered modified characters comprise a profile mimicking the penmanship of the user using the predetermined writing implement pair.

* * * * *